(12) United States Patent
Belz et al.

(10) Patent No.: US 12,362,781 B2
(45) Date of Patent: Jul. 15, 2025

(54) SYSTEM FOR TRANSMITTING INFORMATION VIA ELECTRIC LINES AND METHOD FOR OPERATING THE SYSTEM

(71) Applicant: SEW-EURODRIVE GMBH & CO. KG, Bruchsal (DE)

(72) Inventors: Helmut Belz, Waghäusel (DE); Benjamin Moos, Bretten (DE); Josef Schmidt, Graben-Neudorf (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 15/665,069

(22) Filed: Jul. 31, 2017

(65) Prior Publication Data

US 2018/0145726 A1    May 24, 2018

Related U.S. Application Data

(63) Continuation of application No. 12/446,116, filed as application No. PCT/EP2007/007736 on Sep. 5, 2007, now abandoned.

(30) Foreign Application Priority Data

Oct. 17, 2006  (DE) .................... 10 2006 049 507.1

(51) Int. Cl.
   *H04B 3/54*   (2006.01)
(52) U.S. Cl.
   CPC ....... *H04B 3/54* (2013.01); *H04B 2203/5412* (2013.01); *H04B 2203/5458* (2013.01); *H04B 2203/5462* (2013.01)

(58) Field of Classification Search
   CPC ............ H04B 3/54; H04B 2203/00; H04B 2203/5404; H04B 2203/5462; H04B 2203/6406
   See application file for complete search history.

(56) References Cited

U.S. PATENT DOCUMENTS

| | | |
|---|---|---|
| 3,621,292 A | 11/1971 | Vogel et al. |
| 4,106,007 A | 8/1978 | Johnston et al. |
| 4,218,655 A | 8/1980 | Johnston et al. |
| 4,456,855 A | 6/1984 | Sairanen |

(Continued)

FOREIGN PATENT DOCUMENTS

| | | |
|---|---|---|
| AT | 405 702 B | 11/1999 |
| CN | 1475040 A | 2/2004 |

(Continued)

OTHER PUBLICATIONS

International Search Report, issued Feb. 7, 2008, in International application No. PCT/EP2007/007736 (English-language translation).

(Continued)

*Primary Examiner* — Adi Amrany
(74) *Attorney, Agent, or Firm* — Carter, DeLuca & Farrell LLP (57) ABSTRACT

In a system and method for operating a system, a drive is connectable to a supply-voltage source, especially an AC-voltage source, with the aid of an apparatus, in particular a control unit, via electric lines installed in the system, and information is transmittable between the control unit and the drive, using the lines.

14 Claims, 6 Drawing Sheets

(56) References Cited

U.S. PATENT DOCUMENTS

| | | | |
|---|---|---|---|
| 4,523,194 A * | 6/1985 | Hyde | E21B 17/003 340/855.9 |
| 4,668,934 A * | 5/1987 | Shuey | H04B 3/56 340/870.03 |
| 4,670,831 A | 6/1987 | Fauvet et al. | |
| 4,774,474 A * | 9/1988 | Beauducel | H03G 3/30 330/129 |
| 4,903,006 A | 2/1990 | Boomgaard | |
| RE33,504 E | 12/1990 | Yuhasz et al. | |
| 5,093,660 A * | 3/1992 | Beauducel | G01R 19/25 341/139 |
| 5,212,484 A * | 5/1993 | Hillis | G06F 1/10 341/118 |
| 5,289,529 A * | 2/1994 | Karnowski | H04M 1/6505 379/395 |
| 5,491,386 A | 2/1996 | Eriguchi et al. | |
| 5,637,933 A | 6/1997 | Rawlings et al. | |
| 5,670,931 A * | 9/1997 | Besser | H04B 3/542 340/310.14 |
| 5,675,221 A | 10/1997 | Yoo et al. | |
| 5,689,230 A | 11/1997 | Merwin et al. | |
| 5,691,691 A | 11/1997 | Merwin et al. | |
| 5,798,723 A * | 8/1998 | Fong | H03M 1/0604 323/315 |
| 5,859,769 A | 1/1999 | Escudero | |
| 5,896,025 A | 4/1999 | Yamaguchi et al. | |
| 5,932,934 A | 8/1999 | Hofstetter et al. | |
| 5,982,142 A | 11/1999 | Sullivan et al. | |
| 6,049,473 A * | 4/2000 | Jang | H02M 1/4216 363/44 |
| 6,055,163 A | 4/2000 | Wagner et al. | |
| 6,191,965 B1 | 2/2001 | Matsumoto | |
| 6,194,996 B1 * | 2/2001 | Okazaki | H04B 3/542 370/479 |
| 6,218,787 B1 | 4/2001 | Murcko et al. | |
| 6,222,751 B1 | 4/2001 | Portaluri et al. | |
| 6,275,144 B1 | 8/2001 | Rumbaugh | |
| 6,288,504 B1 | 9/2001 | Imamura et al. | |
| 6,297,724 B1 | 10/2001 | Bryans et al. | |
| 6,324,084 B1 | 11/2001 | Fujisawa | |
| 6,414,615 B1 * | 7/2002 | Cheng | H03M 3/37 341/143 |
| 6,549,120 B1 | 4/2003 | de Buda | |
| 6,577,185 B1 * | 6/2003 | Chandler | H03F 1/0277 330/133 |
| 6,580,277 B1 * | 6/2003 | Bolz | B60R 16/03 324/608 |
| 6,628,089 B2 | 9/2003 | Suomi | |
| 6,809,633 B2 | 10/2004 | Cern | |
| 6,897,764 B2 | 5/2005 | Cern | |
| 6,987,430 B2 | 1/2006 | Wasaki et al. | |
| 7,084,783 B1 * | 8/2006 | Melvin, Jr. | G01D 11/24 340/870.02 |
| 7,126,300 B2 | 10/2006 | Matsubara et al. | |
| 7,164,238 B2 | 1/2007 | Kazanov et al. | |
| 7,241,979 B2 | 7/2007 | Kil | |
| 7,323,968 B2 | 1/2008 | Iwamura | |
| 7,390,992 B2 | 6/2008 | Morgandi | |
| 7,405,652 B2 | 7/2008 | Hair et al. | |
| 7,411,359 B2 | 8/2008 | Chung et al. | |
| 7,427,787 B2 | 9/2008 | Steinhoff | |
| 7,457,096 B2 | 11/2008 | Brundula | |
| 7,482,758 B2 | 1/2009 | Hua et al. | |
| 7,522,812 B2 | 4/2009 | Zitting | |
| 7,570,031 B2 | 8/2009 | Salvestrini | |
| 7,671,701 B2 | 3/2010 | Radtke | |
| 8,193,785 B2 | 6/2012 | Peto | |
| 8,593,266 B2 * | 11/2013 | Robertson | H04B 3/54 340/13.23 |
| 2002/0089802 A1 * | 7/2002 | Beckwith | H02H 7/16 361/63 |
| 2002/0149507 A1 * | 10/2002 | Kaul | H03M 1/1014 341/159 |
| 2002/0171535 A1 * | 11/2002 | Cern | H04B 3/56 375/258 |
| 2003/0036864 A1 * | 2/2003 | Randall | G01R 22/00 702/79 |
| 2003/0090219 A1 | 5/2003 | Kazanov et al. | |
| 2004/0037221 A1 | 2/2004 | Aisa | |
| 2004/0207342 A1 | 10/2004 | Novikov | |
| 2004/0239271 A1 | 12/2004 | Matsubara et al. | |
| 2005/0168369 A1 * | 8/2005 | Kobayashi | H03M 1/167 341/156 |
| 2005/0184977 A1 | 8/2005 | Itoh et al. | |
| 2005/0190785 A1 * | 9/2005 | Yonge, III | H04L 5/0044 370/465 |
| 2006/0012336 A1 | 1/2006 | Fujita | |
| 2006/0076830 A1 | 4/2006 | Hair et al. | |
| 2006/0077086 A1 * | 4/2006 | Cringean | H03M 1/1215 341/155 |
| 2006/0125674 A1 * | 6/2006 | Tadeparthy | H03M 1/1225 341/155 |
| 2006/0187108 A1 * | 8/2006 | Moon | H03M 1/146 341/161 |
| 2006/0227483 A1 * | 10/2006 | Akagi | H02M 1/12 361/118 |
| 2006/0227890 A1 | 10/2006 | Koga et al. | |
| 2006/0256488 A1 * | 11/2006 | Benzing | H02H 7/0822 361/23 |
| 2006/0289463 A1 | 12/2006 | Kil | |
| 2007/0110192 A1 | 5/2007 | Steiner | |
| 2007/0247139 A1 * | 10/2007 | Veroni | G01R 29/18 324/84 |
| 2007/0287405 A1 | 12/2007 | Radtke | |
| 2008/0106146 A1 * | 5/2008 | Baek | H04L 12/2803 700/291 |
| 2008/0238573 A1 | 10/2008 | Yamazaki | |
| 2008/0258882 A1 | 10/2008 | Lester et al. | |
| 2009/0002094 A1 * | 1/2009 | Radtke | H04B 3/56 333/132 |

FOREIGN PATENT DOCUMENTS

| | | | |
|---|---|---|---|
| DE | 715 935 C | 1/1942 | |
| DE | 730 567 C | 1/1943 | |
| DE | 24 28 173 A1 | 1/1976 | |
| DE | 28 35 549 A1 | 3/1979 | |
| DE | 42 37 899 A1 | 5/1993 | |
| DE | 44 38 836 A1 | 4/1995 | |
| DE | 100 14 183 A1 | 10/2001 | |
| JP | 57-38035 A | 3/1982 | |
| JP | 57-162536 A | 10/1982 | |
| JP | 2002026730 A * | 1/2002 | |
| WO | 01/86831 A1 | 11/2001 | |
| WO | 02/51025 A1 | 6/2002 | |
| WO | 03/063418 A1 | 7/2003 | |
| WO | WO 2006/049356 * | 5/2006 | H02J 3/14 |
| WO | 2007/059825 A1 | 5/2007 | |
| WO | 2007/077433 A2 | 7/2007 | |

OTHER PUBLICATIONS

International Preliminary Report on Patentability, issued May 5, 2009, in International application No. PCT/EP2007/007736 (English-language translation).

* cited by examiner

SYSTEM FOR TRANSMITTING INFORMATION VIA ELECTRIC LINES AND METHOD FOR OPERATING THE SYSTEM

CROSS-REFERENCE TO RELATED APPLICATIONS

The present application is a continuation of U.S. patent application Ser. No. 12/446,116, filed on Apr. 17, 2009, which is the national stage entry of International Application No. PCT/EP2007/007736, filed on Sep. 5, 2007, which claims priority to German Patent Application No. 10 2006 049 507.1, filed on Oct. 17, 2006, each of which is incorporated herein in its entirety by reference thereto.

FIELD OF THE INVENTION

The present invention relates to a system for transmitting information via electric lines and a method for operating a system for transmitting information via electric lines.

BACKGROUND INFORMATION

Drives often include electric motors which are powered via three-phase lines. Therefore, many systems are designed to be cabled with three-phase lines. However, for transmission of information going beyond switching-off and switching-on operations, further cabling like, for example, fieldbus cabling must be provided.

SUMMARY

Example embodiments of the present invention provide a system in terms of the transmission of information.

According to example embodiments of the present invention, a system includes a drive or another device which is connectable to a supply-voltage source, particularly an AC voltage source, with the aid of an apparatus, especially a control unit, via electric lines installed in the system, information being transmittable between the control unit and the drive or other device, using the lines.

The advantage in so doing is that the supply lines are used, together with their connections to the power supply system. Therefore, the signal frequency used is low-frequency, thus far below 100 Hz, especially far below 60 Hz in the U.S. area or 50 Hz in the European area. The advantage in this case lies in the long range of the information transmission and in the reliability of the data transfer. The reason is that since the system voltages themselves are used, a reliable, error-free recognition of the information is made possible. In addition, the transmission range is considerable in comparison to high-frequency modulation applications.

A further advantage is that components for implementing example embodiments of the present invention may be selected to be very inexpensive and uncomplicated. This is because supply voltages may be easily recognized and determined, especially in comparison to the recognition of high-frequency signals with correspondingly costly signal electronics suitable for high frequencies, together with coupling and decoupling elements or antennas.

In example embodiments, the drive includes devices for measuring the supply voltages assigned to the lines. The advantage here is that resistive series circuits may be used, which are inexpensive and uncomplicated to produce. The measured value is then able to be acquired and processed by an analog-to-digital converter. Alternatively, an analog averaging with the aid of a low-pass filter is also usable, and threshold values may be compared in either digital or analog fashion.

In example embodiments, three lines are used, the drive providing a device for measuring the voltage between each line and a reference potential. This offers the advantage that the simple acquisition of measured values is sufficient, and therefore the present invention is practicable without special expenditure.

In example embodiments, the apparatus includes a half-wave control, particularly for at least one of the three lines. This is advantageous in that the system voltage itself is used, and the positive as well as negative half-waves are usable as medium.

In example embodiments, device(s) are at least provided for forming the difference between two of the measured voltages. The advantage in this case is that, by forming the difference, a reliable recognition of the states is feasible, and therefore a low-error or error-free recognition of the information is feasible.

In example embodiments, a device for curve evaluation, in particular, device(s) for averaging are provided. The advantage here is that the transmitted information is recognizable reliably and in error-free or low-error fashion in the time characteristic of the measured values.

In example embodiments, amplification, especially multiplication by a factor, is provided as a device for the curve evaluation, this factor in particular being selected such that the amplified values are uniquely assigned to the transmitted information, especially either after averaging the amplified values or after curve evaluation, at least the determination of a sign reversal being provided in the case of the curve evaluation, as well. Advantageously, a reliable differentiation between the states is thus made possible in a very simple manner.

In example embodiments, device(s) are provided for the comparison with threshold values, the result of the comparison being usable as transmitted information. The advantage in this case is that the threshold values have sufficient distance from each other, and therefore the error rate in recognizing the states is low.

In example embodiments, a three-phase cable is usable as lines. This is advantageous in that the cabling already available in the system may be used unchanged, thus, retrofitting of an existing system is practicable.

In example embodiments, during the time interval in which information is transmitted, the drive is fully powered only by two of the three phases. This has the advantage that a certain, albeit slightly reduced power is able to be made available for the drive during the period of time the data is being transmitted, as well.

In example embodiments, the information is transmittable on the third phase, which is able to be shifted by the apparatus to different states one after another in time for coding the information. This is advantageous in that two of the phases continue to be usable for the transfer of energy, and the third phase is usable for the reliable transfer of data, using the system voltages.

In example embodiments, a first state is the blocking of negative current components, and a second state is the blocking of positive current components. The advantage here is that signals are used which are recognizable easily, clearly and in fail-safe manner, and which include components of the system-voltage characteristic and/or system-current characteristic.

In example embodiments, a third state is not to connect the third phase, thus, to block the current, and a fourth state is to completely conduct the current. This is advantageous in that even full power is able to be transmitted.

In example embodiments, the drive includes signal electronics for receiving and decoding the information. The advantage here is that these signal electronics are able to be integrated into the signal electronics of the drive converter.

In example embodiments, the drive includes an electronic circuit for reversing the sense of rotation of the three-phase power supply. This offers the advantage that a converter or soft-start device is usable in the same way as a controllable polarity-reversal device that is operable in controllable manner for exchanging two phases. In the case of the polarity-reversal device, electronic or perhaps electromechanical power switches may be used.

In example embodiments, the drive has an electronic circuit for influencing the rotary motion of the rotor of the electric motor, in particular, the circuit includes a motor switch, soft start or converter. This is advantageous in that the drive is implemented with intelligence, that is, a computer and associated memory, and therefore it is possible to integrate a complex control unit and/or regulating unit which executes many tasks independently. Consequently, it is sufficient to transmit only small amounts of data or commands to the drive.

In example embodiments, during the time interval in which information is transmitted, the two of the three phases for powering the drive change, and in the same manner, the third phase changes such that the two other phases are always provided for powering the signal electronics of the drive, and the third phase is provided for transmitting the information. The advantage in this case is that a clear separation of functions is provided, and therefore, a decoupling of power and information transmission.

In example embodiments, the apparatus has a series connection of power switches assigned to the third phase, particularly for blocking or letting through the positive and negative current components. This offers the advantage that a simply implemented half-wave control is usable.

In example embodiments, the power switches are able to be driven by a control. Of advantage in this case is that this control is connectable to a superordinate SPC or a central computer, and therefore data is able to be transmitted.

In example embodiments, the drive includes a rectifier, fed from the lines, whose unipolar, especially rectified output voltage has a negative and positive potential. In particular, the signal electronics of the drive are provided at the negative potential; the voltage between the electrical contacts of the components of the signal electronics and the negative potential in particular is always lower in terms of absolute value than the voltage to the positive potential. This is advantageous in that the signal electronics may be placed at such a potential as reference potential, and therefore the voltages of the lines are able to be measured relative to this potential.

Among features with regard to the method for operating a system are that it includes a drive which is connectable to a supply-voltage source, especially an AC voltage source, with the aid of an apparatus, in particular a control unit, via electric lines installed in the system, information being transmitted between the control unit and the drive via the lines, the supply voltages assigned to the lines being measured, the difference being formed between at least two of the measured voltages, a curve evaluation being implemented.

In this context, it is advantageous that a simple procedure is used, such as subtraction and curve evaluation. Therefore, the expenditure is low, recognizability of the information is good and the error rate is low.

In example embodiments, at least at the beginning, that one of the lines is recognized on which the information is transmitted, particularly by comparing average values of the voltage characteristics of the phases. This is advantageous because that phase is recognizable on which the information is transmitted.

Therefore, at the beginning in a first period of time, that phase on which the information is coded is determined, and thereupon, the information is then able to be transmitted. In this context, further measures such as subtraction and, in particular, curve evaluation, as well, are necessary only for the phase recognized as relevant for the information transfer. Measures like subtraction with respect to the other phases further refine the method as to data transmission; in particular, reliability in recognizing a state is also thereby improved, thus, the error rate is reduced.

In example embodiments, averaging is carried out as curve evaluation. This is advantageous in that an extremely low expenditure is needed.

In example embodiments, comparison is carried out with threshold values, and the result of the comparison is used as transmitted information. The advantage in this case is that by performing a comparison with suitable threshold values, the states are clearly recognizable. Advantageously, in the case of four states, three threshold values are to be set. However, since one or more threshold values are also able to be provided for each state, it is advantageous to set them closely around the measured values to be anticipated. Consequently, error detectability is then improved.

Further features, aspects, and advantages are described below.

DETAILED DESCRIPTION

Example embodiments of the present invention are explained in more detail below with reference to the figures.

Figure 1:
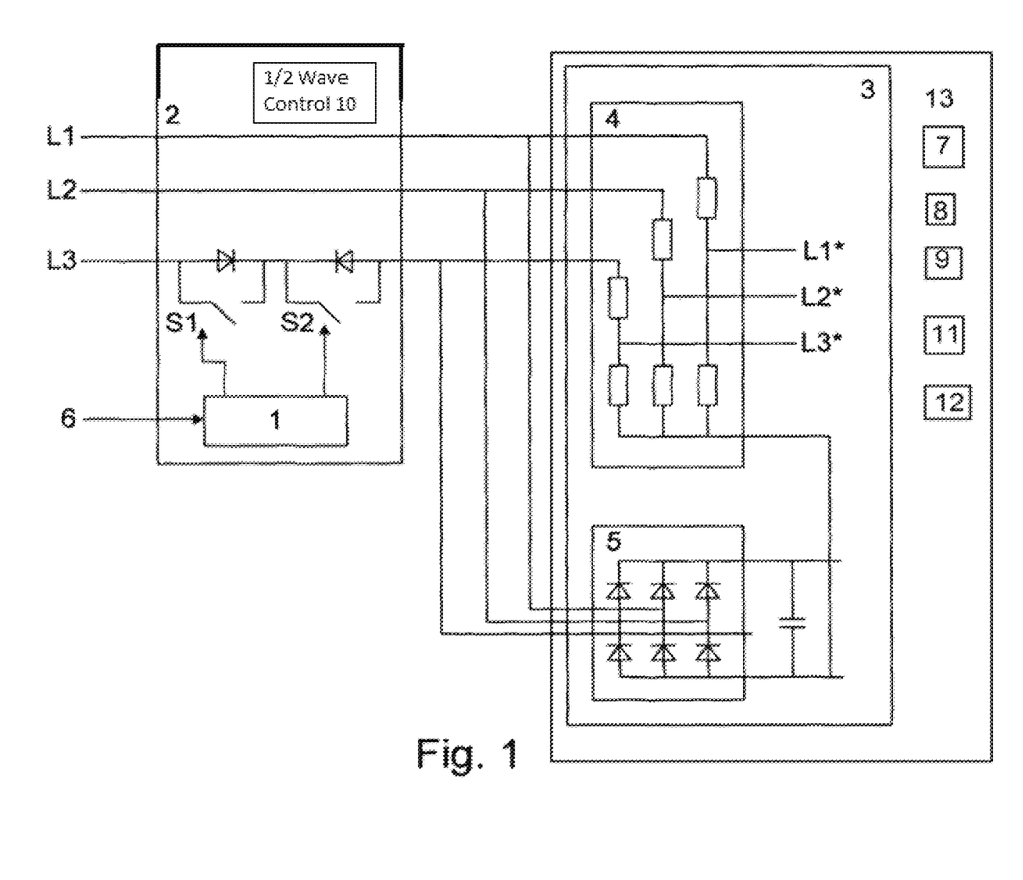
FIG. 1 shows a system according to an example embodiment of the present invention.
Figure 2:
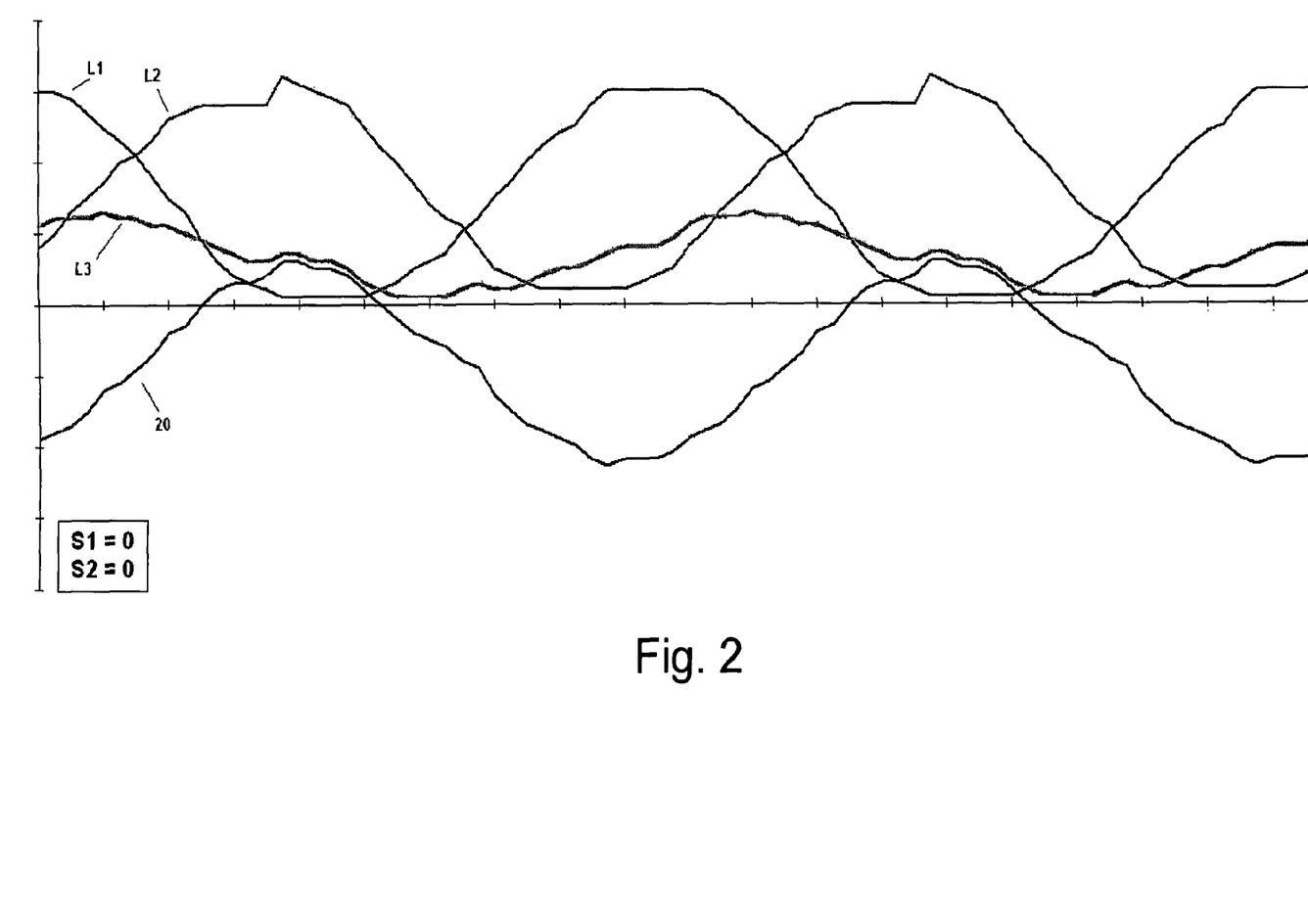
FIG. 2 shows an example of an idealized waveform for a first circuit state where current is blocked on one phase.
Figure 3:
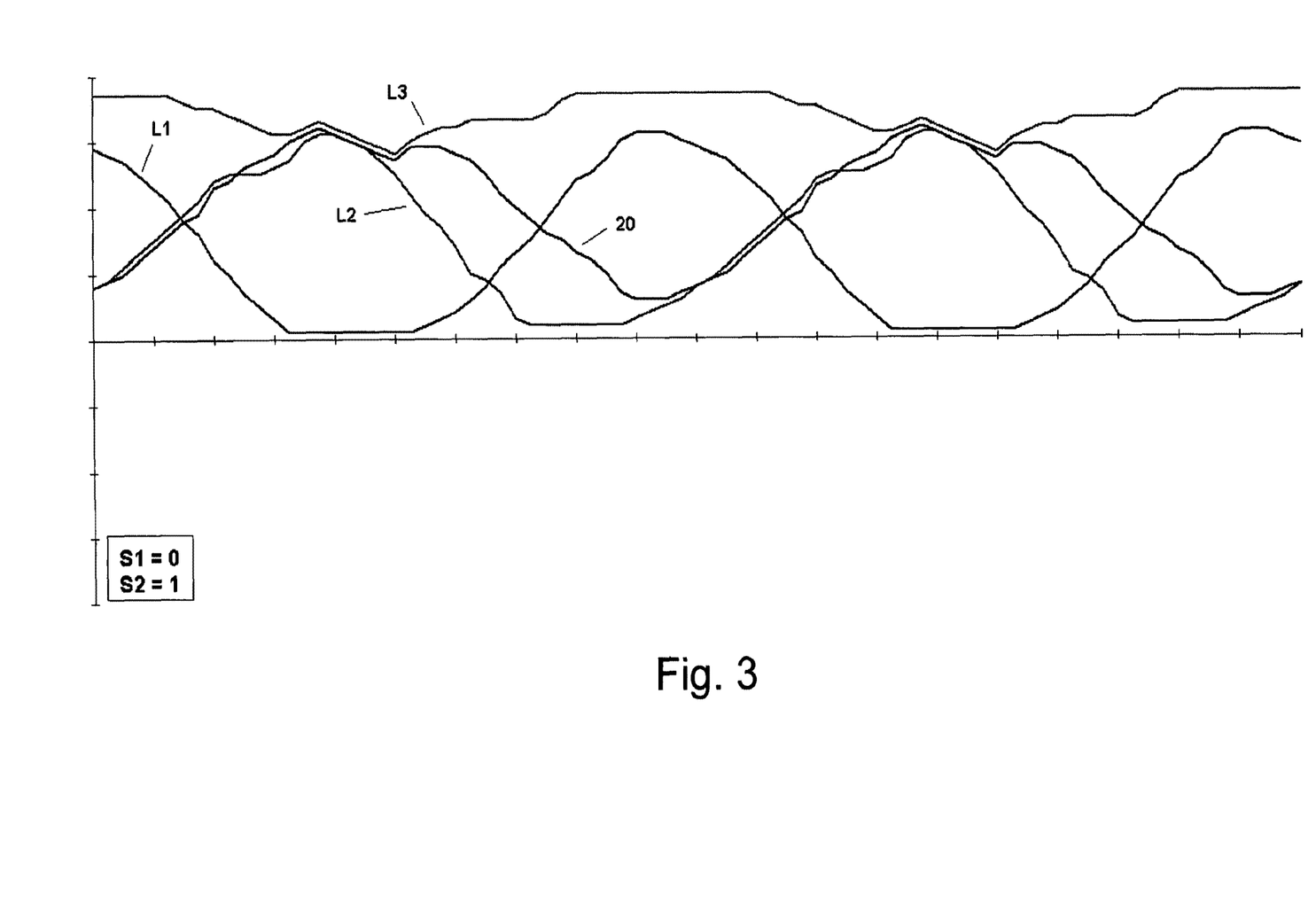
FIG. 3 shows an example of an idealized waveform for a second circuit state where only a positive circuit is enabled on one phase.
Figure 4:
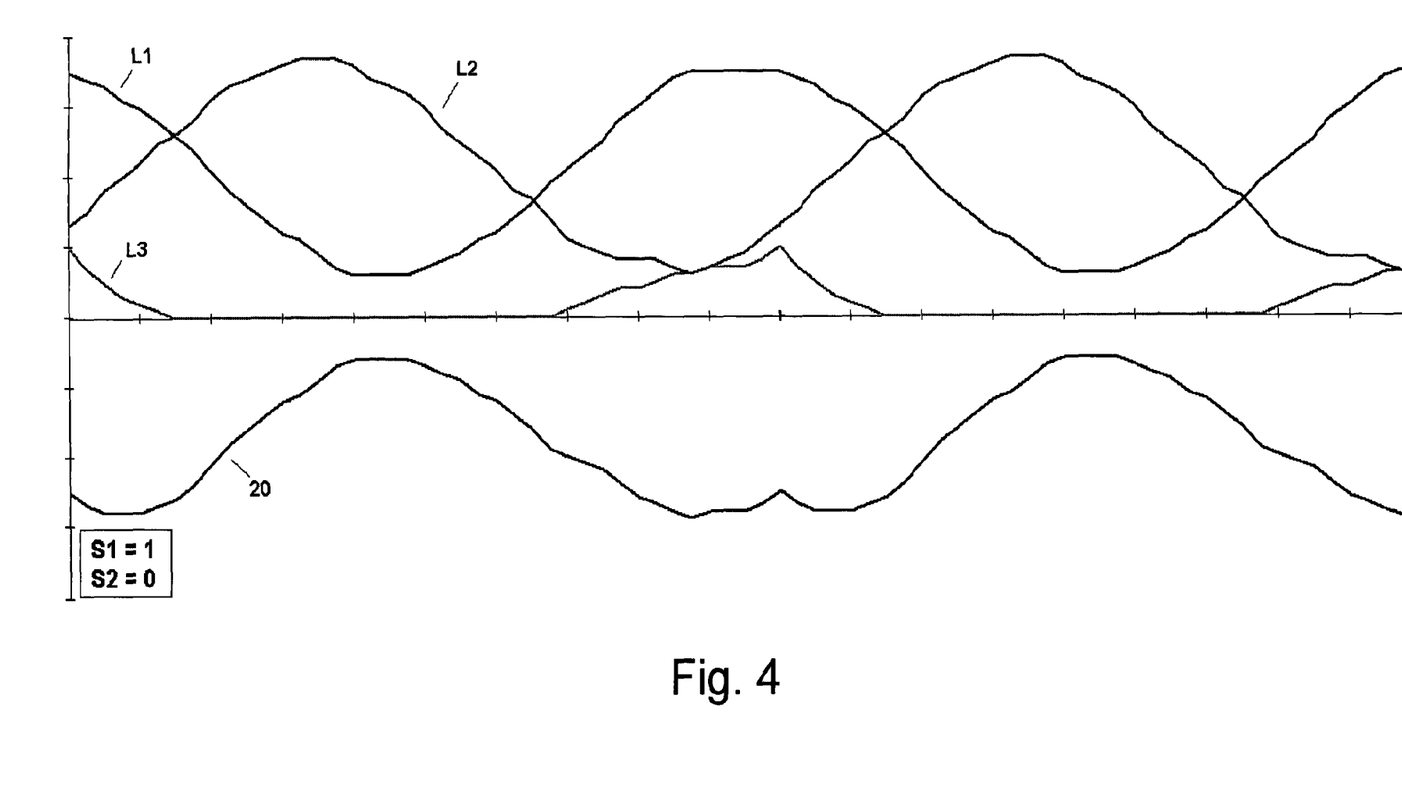
FIG. 4 shows an example of an idealized waveform for a third circuit state where only a negative circuit is enabled on one phase.
Figure 5:
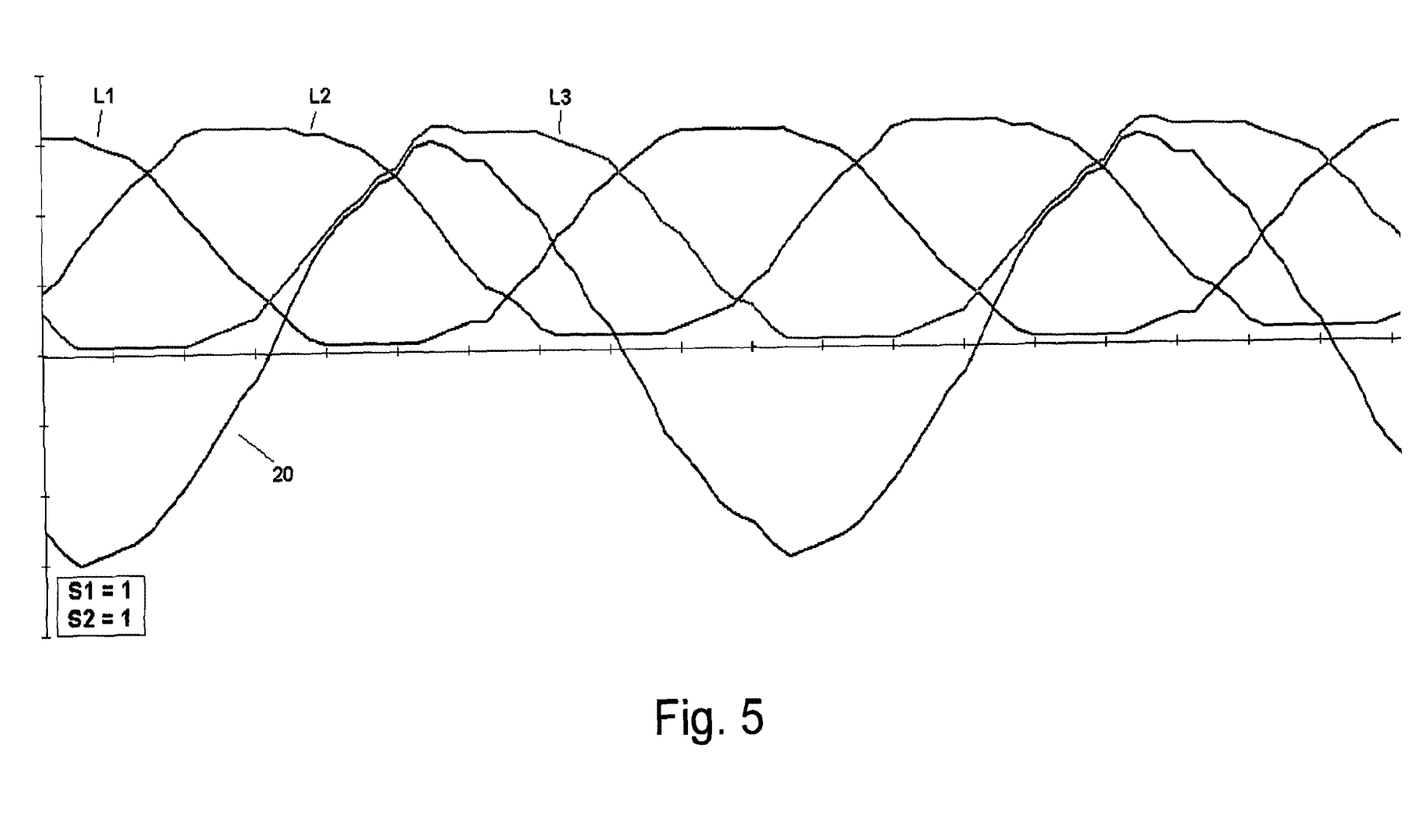
FIG. 5 shows an example of an idealized waveform for a fourth circuit state where current is fully conducted.

FIG. 1 shows a system according to example embodiments of the present invention. An apparatus 2 is provided which includes switches (S1, S2) for blocking or letting through the positive or negative half waves of a phase. In other words, the apparatus 2 includes a half-wave control 10 for at least one of the three lines.

Switches (S1, S2) are driven from a control, which is to transmit an information stream, entering it as control signal 6, to a drive with the aid of the associated supply line.

Figure 6:
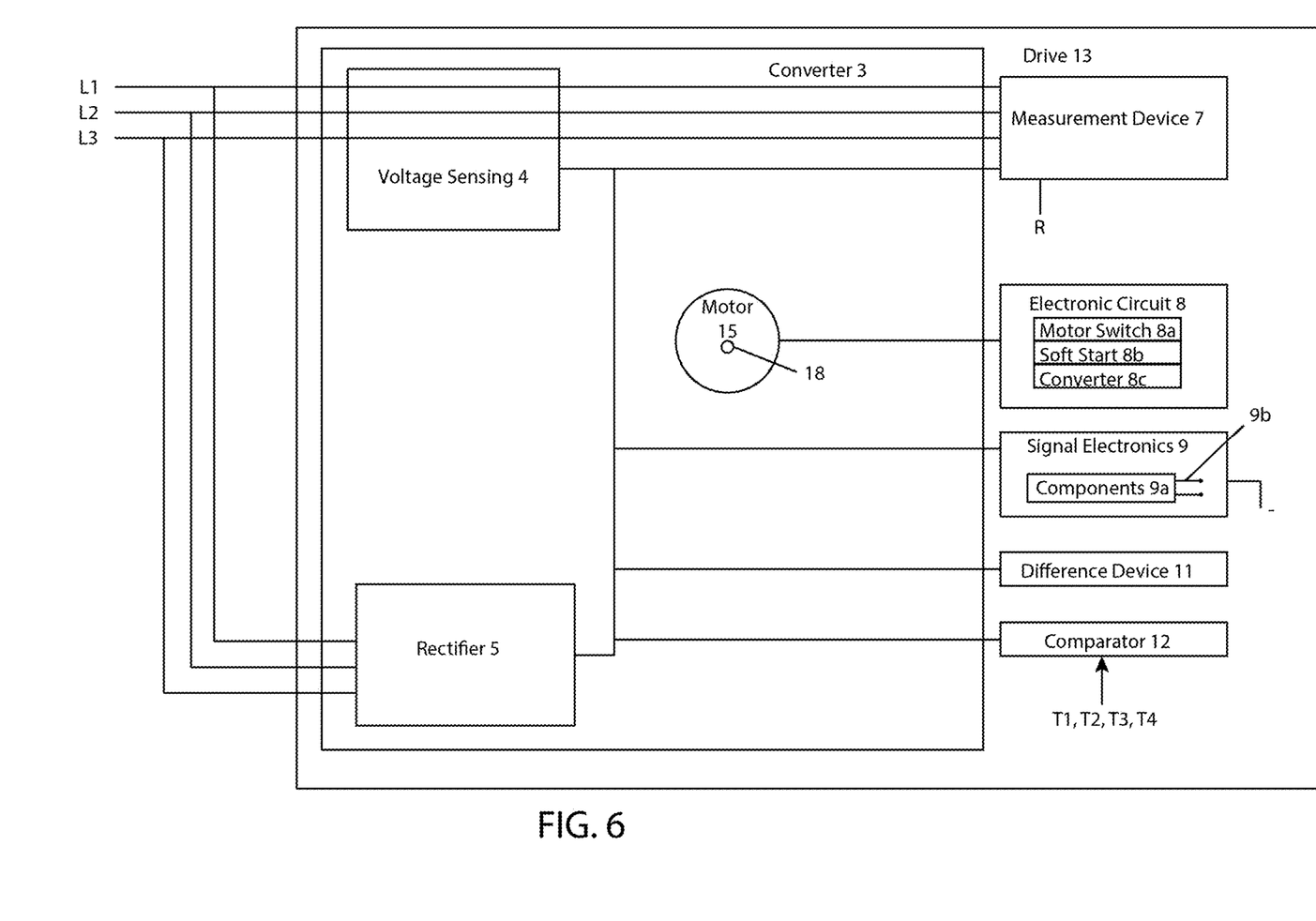
FIG. 6 shows a drive of the system

FIGS. 1 and 6 show that the drive includes at least one converter 3 for the supply of an electric motor 15. The drive includes the electric motor, preferably in the type of construction integrated with converter 3.

In example embodiments of the present invention, the drive is also able to be implemented with a gear unit as a compact drive. Thus, only a single housing is needed for the gear unit, driven by the electric motor, together with converter 3. Such a drive is therefore able to be supplied both with energy and with information via its system supply lines.

The converter according to FIG. 1 is powered via supply lines (L1, L2, L3). Apparatus 2 according to FIG. 1 is implemented such that switches (S1, S2) are each connected in parallel to a diode, and are connected in series to each other. Therefore, in a first circuit state, entire supply line L3 is interrupted. In a second circuit state, only the positive half wave is enabled; in a third, only the negative. In a fourth circuit state, the supply line is able to be provided for conducting the full current.

The four circuit states are used for coding the information to be transmitted.

In so doing, it is provided that the specific circuit state be reliably recognized in the area of the drive.

The indicated converter of the drive includes a rectifier 5 for three-phase current, to which a smoothing capacitor is assigned on the output side. From the "intermediate circuit voltage" applied to this capacitor, an inverter, not shown, at an output stage of the converter is also supplied, which in turn supplies the electric motor.

Voltage sensing 4 acquires measured values (L1*, L2*, L3*), which represent the voltage of supply lines (L1, L2, L3) against the negative potential of rectifier 5.

Each of the measured values is evaluated. In an exemplary embodiment according to the present invention, in so doing, the respective average value is formed. The smallest of the three average values is measured at phase L3 at which the different circuit states are used for coding the information to be transmitted. Only in the fourth circuit state is the phase L3 indistinguishable from the other two phases (L1, L2).

Advantageously, the average value is formed over a time span which corresponds to one or more line periods, thus, 20 ms or an integral multiple thereof at 50 Hz. Preferably, however, the time span is selected such that it also represents an integral multiple of one line period of another electrical network. Thus, for example, a selection of 100 ms is advantageous, since the apparatus is therefore usable at 50 Hz and at 60 Hz.

Consequently, recognition of the phase relevant for the information transfer is made possible in a simple manner by generating the mean value of the associated voltage.

Moreover, after recognition of the phase transmitting the information, the difference is formed, by difference device 11, of recognized phase L3 with respect to one of the two other phases (L1, L2). In FIGS. 2, 3, 4, and 5, idealized waveforms are represented for the first, second, third and fourth circuit states. In so doing, the difference of phase L3 with respect to phase L1 may be obtained. The averaging is applied to these characteristics. In this manner, a reliable recognition of the states of the phase containing the information is made possible; the error rate during the transfer of data is thus reducible, as well.

Each of the four circuit states is able to be characterized by threshold values. Even if interference voltages occur, the threshold values are so far from each other that an unequivocal and reliable recognition of the circuit states is feasible. This is a special advantage of this method.

After recognition of the specific circuit state, the drive evaluates the next, also as a function of the previous. A general data transmission is therefore made possible, as well. Thus, not only is information for a stop command, a manual control, a clockwise rotation and a counterclockwise rotation of the motor able to be transmitted, but also even further information such as an error reset or the like. This further information is able to be coded clearly and unmistakably in the time sequence of the circuit states.

The control signal for control 1 is usable, for example, as a 0 volt or 24 volt signal. However, other types of signals are also usable.

According to example embodiments of the present invention, systems in which a three-phase cable was already installed are able to be retrofitted by using the apparatus described herein and replacing the drive by one as described herein.

Example embodiments of the present invention also provide the advantage that the evaluating signal electronics 9 are able to be provided at the potential of the negative potential of the intermediate circuit voltage. Thus, the entire control electronics of the converter are able to be provided there, together with the signal electronics.

The measured-value signals are able to be evaluated in either analog or digital fashion. In the last-named case, to that end, the signal electronics include at least one analog-to-digital converter.

In further exemplary embodiments of the present invention, instead of the averaging, another curve evaluation of the measured-value characteristics is carried out. For instance, the measured value of phase L3 is amplified by a suitable factor. In so doing, the factor is selectable such that in the second circuit state, the positive maximum value is permanently present, in the third, the negative maximum value, in the first, a value which is clearly different from zero and lies between the positive and negative maximum value, and in the fourth, a value which lies in a narrow range around zero.

In further exemplary embodiments of the present invention, instead of the averaging, a different curve evaluation is carried out.

In additional exemplary embodiments of the present invention, the drive is an inverter motor or a gearmotor or an inverter gearmotor. Alternatively, the drive is implemented as a simple electric motor; in that case, however, only the input power is able to be supplied according to the four circuit states.

In further exemplary embodiments according to the present invention, control S is provided with elements for the input of information such as switches, push buttons, slides or rotary knobs or the like. Preferably, therefore, one knob is provided for clockwise rotation and one knob is provided for counterclockwise rotation. Control signals are generated and coded accordingly.

In exemplary embodiments of the present invention, control 1 is connected to a bus system, including a 24 volt supply line. The control signals are thus then able to be generated and coded by a superordinate control.

Apparatus 2 is thus arranged as a type of electronic control unit.

In exemplary embodiments of the present invention, instead of the three-phase line, a single-phase supply line is used. In this instance, the information transmission functions in an analogous manner.

In exemplary embodiments according to the present invention, instead of the drives or converters 3, different devices are connected to which information is transmitted in the same manner as described in the case of the drives. In particular, counting devices such as electricity meters or gas meters are usable as such devices. A time-dependent determination of consumption and/or a remote control and/or remote query of such counting devices is thus made possible.

As stated above, in example embodiments, comparison is carried out with threshold values, and the result of the comparison is used as transmitted information. The comparison is performed by a comparator 12.

As also stated above, in example embodiments, the drive includes an electronic circuit 8 for reversing the sense of rotation of the three-phase power supply.

As further stated above, in example embodiments, the drive has an electronic circuit 8 for including the rotary motion of the rotor 18 of the electric motor 15, in particular, the circuit includes a motor switch 8a, soft start 8b or converter 8c.

As stated above, the voltage-measurement device measures voltage between each line L1, L2, L3 and a reference potential R.

The invention claimed is:

1. A method for operating a system including an apparatus, having a control unit, connected to a multi-phase AC supply-voltage source, and a device arranged as a drive that includes an electric motor and an electronic circuit that are connected to the apparatus via three lines including a selective one of the three lines and two other lines, each line corresponding to a respective phase of the AC supply-voltage source, the apparatus including two power switches connected to the control unit, each power switch connected in parallel to a respective diode that is external to the power switch and connected in series to each other, each diode being positioned on a selective one of the lines, comprising:
supplying AC voltage from the apparatus to the device via the lines to power the electric motor and the electronic circuit of the drive of the device;
switching the two power switches among four different states of supply voltage of the selective one of the lines one after another in time to encode the information to be transmitted between the control unit and the device on the selective one of the lines, the four different states including: (i) a first state where current is blocked; (ii) a second state where only a positive current is enabled; (iii) a third state where only a negative current is enabled; and (iv) a fourth state where the current is completely conducted;
transmitting the encoded information between the control unit and the device on the selective one of the lines by the switching of the power switches among the four different states of the supply voltage of the selective one of the lines;
measuring supply voltages on each of the plurality of lines;
at a beginning of the transmitting of the encoded information between the control unit and the device on the selective one of the lines, determining, from the measured supply voltages, an average voltage value over a time span for each of the plurality of lines and identifying which one of the plurality of lines is the selective one of the lines based on the average voltage value of the selective one of the lines being different than the average voltage value of other ones of the plurality of lines;
decoding the information transmitted between the control unit and the device on the selective one of the lines by comparing the measured supply voltage on the selective one of the lines to a first threshold to determine that the power switches are in the first state, to a second threshold, different from the first threshold, to determine that the power switches are in the second state, to a third threshold, different from the first threshold and from the second threshold, to determine that the power switches are in the third state, and to a fourth threshold, different from the first threshold, the second threshold, and the third threshold, to determine that the power switches are in the fourth state;
controlling, by the electronic circuit, a rotary motion of a rotor of the electric motor based on the decoded information; and
during a time interval in which the information is transmitted from the control unit to the device over the selective one of the plurality of lines, fully powering the device by only the two other lines.

2. The method according to claim 1, wherein the drive includes a measurement device adapted to measure supply voltages assigned to the lines.

3. The method according to claim 1, wherein the method includes measuring, by the voltage-measurement device, voltage between each line and a reference potential.

4. The method according to claim 1, wherein the apparatus includes a half-wave control for at least one of the three lines.

5. The method according to claim 1, further comprising determining a difference between the measured supply voltage of the selective one of the lines and the measured supply voltage of at least one of the other ones of the plurality of lines.

6. The method according to claim 1, wherein the method includes reversing a rotation direction of the electric motor based on a polarity reversal.

7. The method according to claim 6, wherein the reversing is performed by the electronic circuit.

8. The method according to claim 1, wherein the comparison is performed by a comparator.

9. The method according to claim 1, wherein the decoding is performed by signal electronics.

10. The method according to claim 1, wherein the electronic circuit includes (a) a motor switch, (b) a soft start, and/or (c) a converter.

11. The method according to claim 1, wherein the power switches are switched among the four different states by the control unit.

12. The method according to claim 1, wherein the drive includes a rectifier, fed from the lines, having (a) unipolar and/or (b) rectified output voltage having a negative and positive potential.

13. The method according to claim 12, wherein the negative potential is arranged as a reference potential.

14. The method according to claim 1, wherein (a) the drive includes signal electronics provided at a negative potential and/or (b) a voltage between electrical contacts of components of the signal electronics and the negative potential is always lower in terms of absolute value than the voltage to a positive potential.

* * * * *